(12) United States Patent
Kurian (10) Patent No.: US 10,498,707 B2
(45) Date of Patent: Dec. 3, 2019

(54) IOT ("INTERNET OF THINGS") SELF-SEGMENTED BLOCKS

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 178 days.

(21) Appl. No.: 15/904,528

(22) Filed: Feb. 26, 2018

(65) Prior Publication Data

US 2019/0268316 A1    Aug. 29, 2019

(51) Int. Cl.
  *H04L 29/06*    (2006.01)
  *H04L 9/14*    (2006.01)
  *H04L 9/08*    (2006.01)
  *H04L 9/32*    (2006.01)

(52) U.S. Cl.
  CPC ........ *H04L 63/0478* (2013.01); *H04L 9/0819* (2013.01); *H04L 9/14* (2013.01); *H04L 9/3226* (2013.01); *H04L 63/083* (2013.01); *H04L 2209/76* (2013.01)

(58) Field of Classification Search
  None
  See application file for complete search history.

(56) References Cited

U.S. PATENT DOCUMENTS

| | | | |
|---|---|---|---|
| 9,319,404 B2 * | 4/2016 | Svigals | H04L 63/0861 |
| 9,485,231 B1 | 11/2016 | Reese | |
| 9,565,192 B2 | 2/2017 | Chillappa et al. | |
| 9,591,016 B1 | 3/2017 | Palmieri et al. | |
| 9,699,659 B2 | 7/2017 | Zehavi et al. | |

(Continued)

OTHER PUBLICATIONS

"Securing the Internet of Things: A Proposed Framework," https://www.cisco.com/c/en/us/about/security-center/secure-iot-proposed-framework.html, Mar. 16, 2016.

(Continued)

*Primary Examiner* — Andrew J Steinle
(74) *Attorney, Agent, or Firm* — Weiss & Arons LLP; Michael A. Springs, Esq.

(57) ABSTRACT

Methods for secure communication transmission is provided. Methods include shredding a secure communication into a first plurality of communication segments using a first fine-grain shredding algorithm. Methods include creating a first recombination key suitable for recombining data subjected to the first shredding algorithm. Methods include transmitting each of the first plurality of communication segments and the first recombination key to an intermediary device. Methods include shredding the first plurality of communication segments using a second fine-grain shredding algorithm. Methods include creating a second recombination key suitable for recombining data subjected to the second shredding algorithm. Methods include transmitting the second plurality of communication segments and the first and second recombination key to a target device. Methods include recombining the second plurality of communication segments into the first plurality of communication segments using the first key. Methods include recombining the first plurality of communication segments using the second key.

19 Claims, 6 Drawing Sheets

(56) References Cited

U.S. PATENT DOCUMENTS

| | | | |
|---|---|---|---|
| 9,699,814 B2 | 7/2017 | Zakaria et al. | |
| 9,716,595 B1 | 7/2017 | Kravitz et al. | |
| 9,729,528 B2 | 8/2017 | Zakaria et al. | |
| 9,825,921 B2 | 11/2017 | Reese | |
| 2003/0065656 A1* | 4/2003 | de la Torre | H03M 7/30 |
| 2016/0173495 A1 | 6/2016 | Joo | |
| 2016/0248746 A1 | 8/2016 | James et al. | |
| 2016/0366181 A1 | 12/2016 | Smith et al. | |
| 2017/0163444 A1 | 6/2017 | McLaughlin et al. | |
| 2017/0289184 A1 | 10/2017 | C et al. | |

OTHER PUBLICATIONS

"Global Hacker Botnet tops 6 million hijacked devices," http://www.computerweekly.com/news/450427023/Global-hacker-botnet-tops-6-million-hijacked-devices, Sep. 27, 2017.

\* cited by examiner

IOT ("INTERNET OF THINGS") SELF-SEGMENTED BLOCKS

FIELD OF THE INVENTION

This invention relates to a network of devices. Specifically, this invention relates to securing communications between the devices.

BACKGROUND OF THE INVENTION

The Internet of Things ("IoT") may be loosely characterized as the interaction and communication between various physical objects. The physical objects are typically embedded with computing and communication capabilities.

The physical objects, or IoT devices, may include refrigerators, lights, smartphones, smartwatches, computers, laptops, tablets, sinks, hot water heaters, coffee machines, ovens, vehicles, thermostats and any other suitable objects.

Each of the IoT devices may be configured to communicate with other IoT devices. Because IoT devices are manufactured by different manufacturers using various manufacturing standards in multiple locations, it may be difficult to instantiate communication between devices. Therefore, many times, manufacturers use simple, legacy protocols to facilitate communication between the various IoT devices.

IoT devices, such as a tablet, smartphone or laptop, may have access to and/or include sensitive information. Communications between IoT devices may include the sensitive information. Thus, it may be imperative to secure all communications between the IoT devices to maintain the confidentiality of the sensitive information.

Therefore, it may be desirable to transform the communications into self-segmented blocks prior to transmission. It may be further desirable for the self-segmented blocks to preserve the confidentiality of communication between IoT devices.

SUMMARY OF THE DISCLOSURE

A system for secure communication transmission between a source device and a target device via a plurality of devices is provided. The system may include the source device. The source device may be configured to create and/or receive a secure communication. The source device may shred, using a first fine-grain shredding algorithm, the secure communication into a first plurality of communication segments. The source device may also create a first recombination key suitable for combining data subjected to the first fine-grain shredding algorithm.

The source device may transmit each of the first plurality of communication segments and the first recombination key to an intermediary device. The intermediary device may be one of the plurality of devices.

The source device may destroy the first recombination key, the plurality of communication segments and the secure communication resident on the source device.

The system may include the intermediary device. The intermediary device may shred the first plurality of communication segments into a second plurality of communication segments using a second fine-grain shredding algorithm.

The intermediary device may create a second recombination key suitable for combining data subjected to the second fine-grain shredding algorithm. The intermediary device may merge the first recombination key with the second recombination key into a third recombination key.

The intermediary device may transmit each of the second plurality of communication segments and the third recombination key to the target device.

The intermediary device may destroy the first recombination key, the second recombination key, the third recombination key and the plurality of communication segments resident on the intermediary device.

The target device may separate the third recombination key into the first recombination key and the second recombination key. The target device may recombine the second plurality of communication segments into the first plurality of communication segments using the second recombination key. The target device may also recombine the first plurality of communication segments into the secure communication at the target device.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

A method for transmitting secure communications from a source device to a target device via a plurality of devices is provided. The method may include creating and/or receiving a secure communication at the source device.

Exemplary source devices include IoT devices, such as thermostats, refrigerators, human-wearable devices and any other suitable devices. The secure communication may include proprietary information, such as personal identification numbers, identification information, bank account numbers, credit card information and other such privileged information. The secure communication may be generated, created and/or received at the source device. In some embodiments, a user may enter secure information into an IoT device.

The method may include shredding the secure communication into a first plurality of communication segments. The shredding may be executed using a first fine-grain shredding algorithm. It should be appreciated that the first fine-grain shredding algorithm may be similar to a fine-grain shredder that utilizes multiple-angled cuts to shred physical papers.

The method may include creating a first recombination key suitable for recombining data subjected to the first fine-grain algorithm. The key creation and/or generation process may occur at the source device.

The method may include transmitting each of the first plurality of communication segments and the first recombination key to an intermediary device.

In some embodiments, the first plurality of communication segments may be transmitted directly to the target device. In these embodiments, the first recombination key may or may not be transmitted directly to the target device. In some instances, the first recombination key may be transmitted to one or more intermediary devices, which transmits the first recombination key to the target device.

The method may include destroying the first recombination key and/or the plurality of communication segments stored at the source device. The destruction step may heighten the security as follows. In the event that the source device becomes compromised, the secure communication is no longer stored at the source device and therefore cannot become compromised.

The method may include shredding the first plurality of communication segments into a second plurality of communication segments. The shredding may be executed using a second fine-grain shredding algorithm. It should be appreciated that the second fine-grain shredding algorithm may be similar to fine-grain shredders that utilizes multiple-angled cuts to shred physical papers.

The method may include creating and/or generating a second recombination key suitable for recombining data subjected to the second fine-grain shredding algorithm. The second recombination key creation and/or generation may be performed at the intermediary device.

The method may include merging the first recombination key with the second recombination key into a third recombination key.

The method may include transmitting each of the second plurality of communication segments and the third recombination key to the target device.

The method may include destroying the first recombination key, the second recombination key, the third recombination key and/or the plurality of communication segments stored at the intermediary device.

The method may include separating the third recombination key into the first recombination key and the second recombination key at the target device.

The method may include recombining the second plurality of communication segments into the first plurality of communication segments using the second recombination key. The method may include recombining the first plurality of communication segments into the secure communication at the target device.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
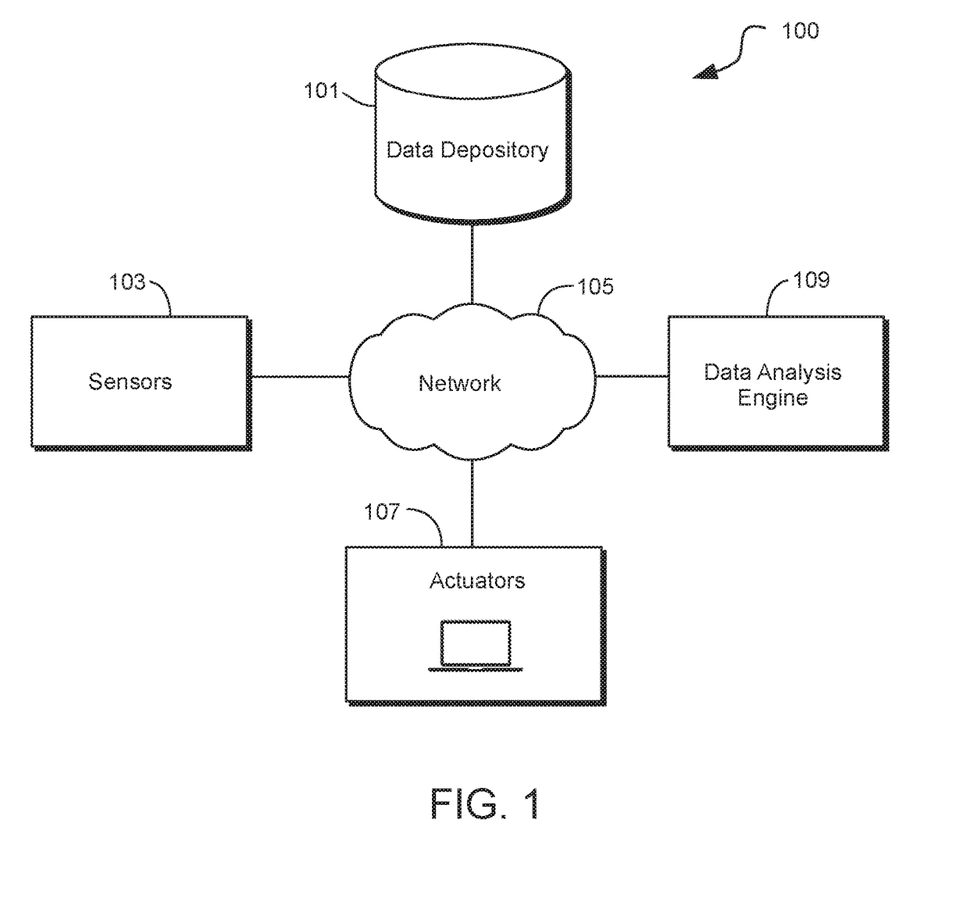
FIG. 1 shows an illustrative flow chart in accordance with principles of the invention.

FIG. 1 shows illustrative system architecture 100. Architecture 100 may represent an internet of things ("IoT"). A differentiator between IoT and conventional networks is a traffic profile. In an IoT, nodes may not have defined or known network positions, communication protocols or security services. Solutions that allow architecture 100 to function seamlessly and leverage such disparate components are disclosed herein.

Architecture 100 may include nodes. Each node may include two or more nodes. FIG. 1 shows exemplary nodes 101, 103, 105, 107 and 109. The architecture includes sensors 103. Sensors 103 may include devices that detect changes in a physical or virtual environment. For example sensors may measure audio, rainfall, temperature or water levels. Sensors may measure electronic network traffic, electronic signals (e.g., input or output) or frequency of user logins from within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smart phones, jewelry or refrigerators. Sensors may be relatively inexpensive and have low energy consumption. Sensors may "sense" one or more stimuli or environmental changes.

Sensors may implement one or more functions. For example, sensors may measure changes in their native environment, capture data related to the measured changes store and communicate the captured data. Sensors may be accessed by other sensors or any other node. Sensors may transmit captured data to another node. Sensors may broadcast captured data to one or more nodes.

Captured data may be transmitted using any suitable transmission method. For example, data captured by a sensor may be extracted by a mobile phone. Sensors may leverage a communication link provided by a mobile phone to communicate captured data to another node.

Each sensor may be a node and each sensor may be assigned a unique identifier. For example, sensors may be identified by one or more radio frequency identification ("RFID") tags. The RFID tag may be stimulated to transmit identity information about the sensor or any other information stored on the RFID tag.

Captured data may be transmitted by the sensor and processed far from the location of the sensor that captured the data. For example, captured data may be transmitted from one node to another node until the captured data reaches data repository 101.

Sensors maybe positioned and capture data from diverse locations. Locations may include geographic locations or virtual locations on electronic networks. Captured data may be transmitted to a location where information is needed for decisioning or consumption, which may not be the same place the data was captured or generated. Data synchronization protocols and caching techniques may be deployed to ensure availability of information at, or delivery to, a desired node. For example, a location where data is captured may not have continuous reliable network connectivity. Accordingly, captured data may be stored locally on the sensor for an amount of time prior to transmission or broadcast to another node.

Contextually, captured data may provide information not only about the physical environment surrounding a sensor, but the capturing of data from multiple sensors may provide data that signifies an event. Sensors may be grouped. Sensors may be grouped based on physical proximity or based on the content (or expected content) of data captured. Sensors may be grouped virtually. Other nodes, such as data analysis engine 109 may create and/or be included in such groups. In some embodiments, the captured data may be organized by data repository 101.

Based on data captured from sensors 103, actuators 107 may respond to a detected event. Based on the capture and analysis of multiple sources of data, actuators 107 may be instructed to take action without human intervention.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable operation.

A processor circuit may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a processor circuit may be coupled together by a system bus, wirelessly or by other interconnections and may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 1, a node may operate in a networked environment. A node may be part of two or more networks. A node may support establishing network connections to one or more remote nodes. Such remote nodes may be sensors, actuators or other computing devices. Nodes may be personal computers or servers. Network connections may include a local area network ("LAN") and a wide area network ("WAN"), and may also include other networks. When used in a LAN networking environment, a node may be connected to the LAN through a network interface or adapter. The communication circuit may include the network interface or adapter.

When used in a WAN networking environment, a node may include a modem or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a battery, speaker, and antennas. Network nodes may be portable devices such as a laptop, tablet, smartphone, "smart" devices (e.g., watches, eyeglasses, clothing having embedded electronic circuitry) or any other suitable device for receiving, storing, transmitting and/or displaying relevant information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display power must be supplied to the entire backlight, even to illuminate just one pixel in the display. In contrast, an OLED display does not necessarily include a backlight. Furthermore, in an OLED display, preferably, only the illuminated pixel draws power.

The power efficiency of OLED technology presents a possibility for designing nodes that provide enhanced security and functionality. Illustrative devices that may be constructed using OLED technology are disclosed in U.S. Pat. No. 9,665,818, which is hereby incorporated by reference herein in its entirety.

A node may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, being executed by a computer. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that powers one or more components of a node.

Sensors in a single architecture or other grouping may be produced by different manufacturers. Sensors may capture data in different formats. For example, sensors may use different data structures to package captured data. Sensors 103 may utilize different communication protocols to transmit captured data or communicate with other nodes. Despite such operational differences, sensors 103 may operate substantially seamlessly together. Interoperability may allow captured data to be substantially seamlessly captured and interpreted by data analysis engine 109. Based on interpreting the captured data, data analysis engine 109 may issue instructions to actuators 107.

Interoperability may be implemented across any suitable nodes of architecture 100. Interoperability may enable communication between sensors 103 and other nodes. Interoperability may enable architecture 100 to provide services and applications via actuators 107. Interoperability may allow services and content to be provided anywhere, anytime and based on input/output of different nodes.

Data gathering by one or more of sensors 103 may be controlled by one or more other nodes of architecture 100. For example, data analysis engine 109 may control a quantity of data captured by sensors 103. Alternatively, data repository 101 and/or analysis engine 109 may filter or otherwise intelligently process data captured by sensors 103.

Timing of when data is captured by sensors 103 may be controlled by any suitable node on architecture 100. For example, data may be captured in real-time or at pre-defined intervals such as once a day. Data may also be captured in response to a detected environmental status change.

Data analysis engine 109 may filter data captured by sensors 103. Data analysis engine 103 may repackage or reformat captured data. Data conversion may include transformation of low level raw data (possibly from multiple sensors or groups of sensors) into meaningful information for a target audience or for a target analysis.

For example, captured data intended for human consumption or interaction may be converted into a human understandable format. Captured data intended for machine consumption may be converted into a format readable by a particular machine or node.

Data analysis engine 109 may perform pattern recognition to identify correlations and trends in captured data. Data analysis engine 109 may also evaluate a cost of obtaining data. "Costs" may be monetary (e.g., labor costs or infrastructure costs), time-related or related to a level of intrusion needed to obtain desired data. "Costs" may be bandwidth-related.

For example, a communication link may be associated with a fixed bandwidth. The bandwidth may limit an amount of information or a rate of transmission over the communication link.

For example, a sensor may respond slowly to a request from another node if there is a large amount of informational traffic traveling on a communication link shared with other nodes. The large amount of informational traffic may not leave sufficient bandwidth for the transmitting node to timely communicate with the requesting node.

As a further example, a sensor may respond slowly if the sensor transmits a large amount of captured data. The large amount of information transmitted by the sensor, together with other informational traffic traveling on the shared communication link, may be close to, or exceed the bandwidth of the communication link. As a result, sensors may be unable to transmit captured date in a timely manner.

Data travelling within architecture 100 to/from nodes may be routed along multiple communication links until the transmitted information reaches a desired destination node (e.g., data analysis engine 109). Each communication link may service a number of connected nodes and a respective volume of informational traffic.

It may be difficult to ascertain available bandwidth on a particular communication link. It may be difficult to ascertain which communication links are being utilized to transmit information between nodes. Nodes attempting to transmit information over a communication link may not be aware of a number of connected nodes, a volume of traffic on a particular communication link or a bandwidth capacity of a communication link.

Furthermore, a communication link may be controlled by a different entity from an entity responsible for operation of a particular node. The entity responsible for operation of the node may be unable to monitor a number of nodes that share a communication link, a bandwidth capacity of a communication link or a volume of traffic transmitted on a communication link. Despite difficult to predict conditions on a communication link, it would be desirable for a node to timely respond to a request for information or timely receive desired information.

Sensors 103 may belong to, or operated by, different administrative/management domains. Sensors 103 may be operated by different domains without expressly-defined relationships among such domains. The absence of express relationships enables access to data captured by sensors 103 by one or more architectures having one or more features in common with architecture 100. Groups of sensors may include sensors from two or more administrative domains.

Data repository 101 may receive data captured by sensors 103. In some embodiments, data captured by sensors 103 may be transmitted directly to data analysis engine 109. Data stored in repository 101 may be sorted and analyzed by data analysis engine 109. Data stored in data repository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may optimize processes, reduce loss (e.g., fraud), improve customer understanding and targeting, increase automation, decrease latency in products and/or services provided by actuators 107 and identify new analytical models that may utilize data captured by sensors 103.

Architecture 100 may include one or more layers of software applications. Software applications may implement a variety of functions and provide varied services to nodes of architecture 100. Software applications running on data analysis engine 109 may submit requests to sensors 103 for retrieval of specific data to achieve a functional goal provided by actuators 107. Software applications may control data captured by sensors 103 or actions taken by actuators 107. Software applications may control a flow of information within architecture 100.

Software applications may be implemented on a node. A node may be an enterprise system or a "cloud" of computing devices. On device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as sensors (e.g., to achieve a target functionality). Middleware may be responsible for aggregating data captured by sensors 103 and passing captured data to data repository 101 and/or data analysis engine 109.

Software applications may provide security services that mitigate threats to the integrity of data captured by sensors 103 or architecture 100 generally.

Actuators 107 may respond to data transmitted or processed by other nodes such as data analysis engine 109. Actuators 107 may include devices that modify the physical state of a physical entity. Actuators 107 may include devices that modify a virtual state of information. For example, actuators 107 may move (translate, rotate, etc.) physical objects or activate/deactivate functionalities of more complex ones. An actuator may dim a light bulb, open a door, change a temperature setting, authorize access to an automated-teller-machine ("ATM") and/or any other suitable functionality. Actuators 107 may verify identities, trigger electronic payments, extend credit or debit accounts.

Within an intelligent networked system such as architecture 100, sensors 103 perform the functions of input devices—they serve as, for example, "eyes," collecting information about their environment. In contrast, actuators 107 act as "hands," implementing decisions based on data captured by sensors 103. A single node may include the functions of sensors and actuators.

Actuators 107 may communicate with data analysis engine 109 and sensors 103. Actuators 107 may include an application programming interface ("API") for communicating with other nodes. Actuators 107 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision and communication processes for actuators 107.

In the absence of express relationships between sensors and the devices that access data captured by the sensors traditional approaches for managing trust, security naming, discovery, or other traditional network services may not be applicable or available. Methods and apparatus for transmitting secure communications from a source device, such as an IoT device, to a target device, via a plurality of devices is provided. Various shredding algorithms may be applied to one or more of the secure communications at different points during the communication process.

Generally, nodes of architecture 100 may interact and cooperate using one or more interaction paradigms. Exemplary interaction paradigms include client-server and peer-to-peer interactions. Illustrative communication protocols may include HyperText Transfer Protocol ("HTTP"), Simple Object Access Protocol ("SOAP"), REpresentational State Transfer ("REST") Constrained Application Protocol ("CoAP") or SensorML.

As a result of the disparate nature of sensors 103, an architecture, such as architecture 100 incorporating sensors 103 may support a variety of communication protocols. Illustrative supported protocols may include IEEE 802.15.4 ("ZigBee"), IEEE 802.11, 3G and 4G and LTE. For example, ZigBee requires approximately 20 to 60 mW (for 1 mW transmission power, a range of 10 to 100 meters and a data transmission rate of 250 kbit/s).

To conserve energy, a sensor may communicate wirelessly for short periods of time. Utilizing this approach, one or more standard size single cell cylindrical dry battery batteries (e.g., AA size) may provide requisite computing power and wireless communication for many months.

Communication protocols used by nodes (e.g., sensors or actuators) may not have, or may not be capable of having, security capabilities. A security layer or buffer may be implemented by nodes that receive or rely on data captured by insecure sensors. Sensors or other nodes may be dynamically added or removed from an architecture. A security layer or buffer may be modular to scale quickly and meet growth/contraction requirements.

A physical layer may physically link nodes of architecture 100. The function of this physical layer is to provide communication pathways to carry and exchange data and network information between multiple sub-networks and nodes.

Figure 2:
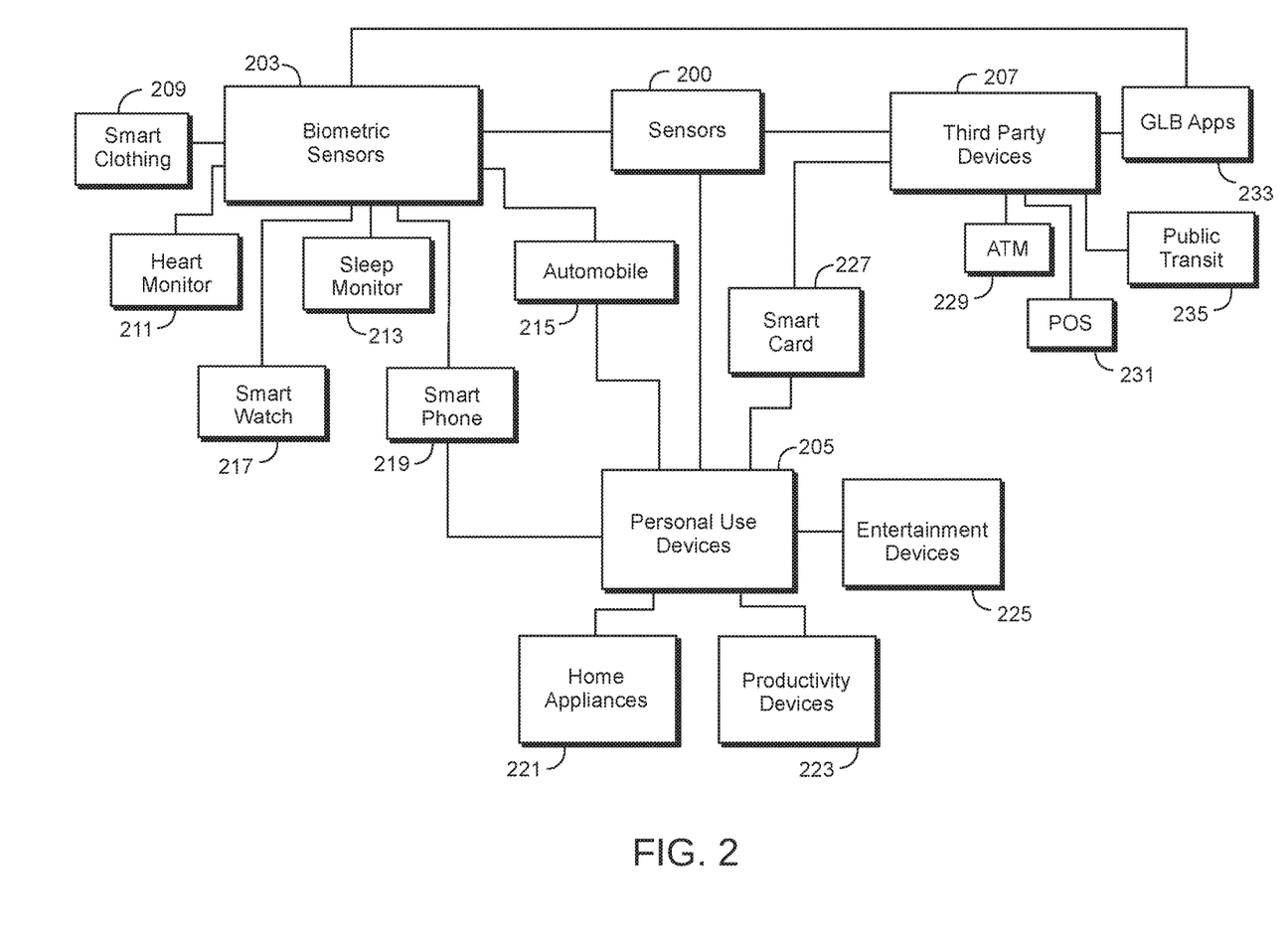
FIG. 2 shows another illustrative flow chart in accordance with principles of the invention.

FIG. 2 shows illustrative sensors 200. Sensors 200 may include or more features of sensors 103 (shown in FIG. 1). Sensors 200 include biometric sensors 203 that sense biometric attributes. For example, biometric sensors may be embedded in "smart" clothing 209 that monitors a wearer's physical condition. Such clothing may capture biometric data, such as pulse rate, temperature, muscle contraction, heart rhythm and physical movement. Smart clothing may be linked to smart phone 219 such as via a Bluetooth® communication link. Smart phone 219 may transmit data captured by smart clothing 209 to one or more other network nodes.

Biometric sensors 203 may include other illustrative sensors such as heart monitor 211, sleep monitor 213, smart watch 219, smart phone 219 and automobile 215.

Sensors 200 may include personal use devices 205. Personal use devices 205 may include sensors embedded in home appliances 221, productivity devices 223 or entertainment devices 225. Productivity devices 223 may include tablets, laptops or other personal computing devices. Entertainment devices may include gaming consoles and the like.

Sensors 200 also include third-party devices 207. Third-party devices may include devices that are not under the direct or exclusive control of a user. A user may interact with third-party devices 207 to obtain a desired service provided by the third-party.

Exemplary third party devices include smart card 227. Smart card 227 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Suitable purchasing instruments may include a credit card, debit card and electronic purchasing devices. Such purchasing instruments may sense a location or frequency of use.

Such purchasing instruments may include "EMV" chips. EMV is a technology that derives its name from the companies (Europay, MasterCard, and Visa) that helped develop the technology. When the credit card and its associated EMV chip are inserted into a specialized card reader (another sensor), the reader powers the EMV chip and the EMV chip generates a new authorization code each time the credit card is used. The EMV chip may capture transaction data such as amounts, location or identity of the chip reader.

Third-party sensors 207 may include ATMs 229, point-of-sale terminals ("POS") 231 and public transit 235. Such devices may also be actuators.

Third-party devices may also include software applications 233. Applications 233 may be used to access services, such as an online banking portal. Such applications may detect biometric features to authorize access to the online banking portal. Third-party devices may include sensors that capture data associated with power consumption (e.g., smart grids), electronic communication traffic, logistics (package movement) or any other suitable environmental condition.

FIG. 2 shows that sensors may categorically overlap. For example, an application used to access an online bank portal may capture a biometric feature (e.g., fingerprint) to authenticate a user.

Each of the sensors shown in FIG. 2 may include different and possibly incompatible hardware. For example, sensors may each have different operating systems (or none at all), processor types and memory. Sensors 200 may be inexpensive, single-function devices with rudimentary network connectivity. Sensors 200 may be positioned in remote and/or inaccessible locations where human intervention or configuration is difficult.

To conserve power, sensors 200 may utilize 16-bit microcontrollers. Such microcontrollers may use less than 400 µW per MIPS ("million instructions per second") and may be capable of operating TCP/IPv6 stacks with 4 kB RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication standards.

Furthermore, because of potentially disparate features and characteristics of sensors 200, security solutions disclosed herein may be used to verify an authenticity of data transmitted by sensors having disparate hardware and software capabilities.

Figure 3:
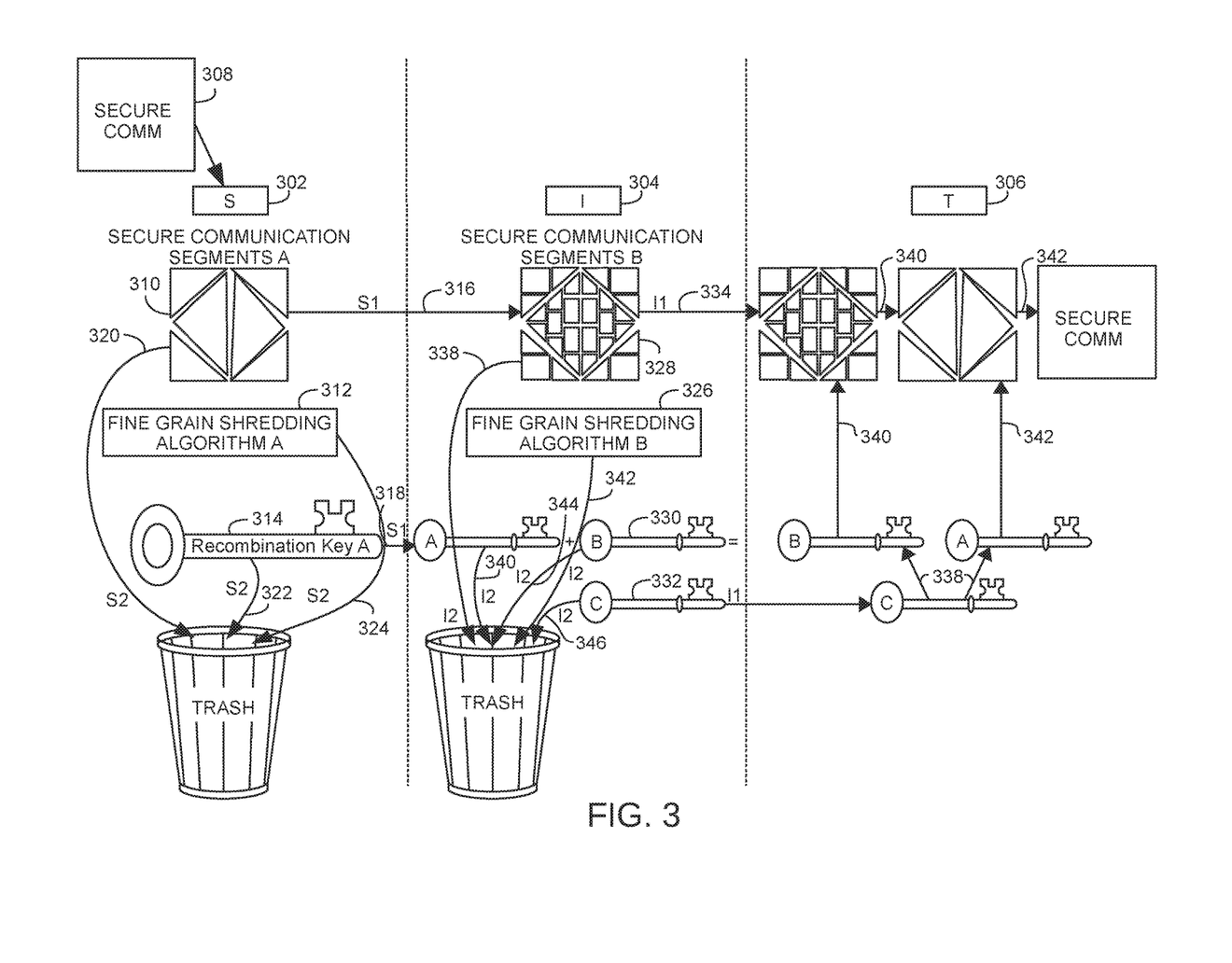
FIG. 3 shows an illustrative diagram in accordance with principles of the invention.

FIG. 3 shows an illustrative diagram in accordance with principles of the invention. Secure communication 308 may be transmitted to source device 302. Source device 302 may be an IoT device. In some embodiments, secure communication 308 may be generated and/or created at source device 302. Secure communication 308 may include privileged and/or confidential data.

Source device 302 may shred secure communication 308. Fine grain shredding algorithm A, shown at 312, may be utilized to shred secure communication 308. In some embodiments, fine grain shredding algorithm A may be generated at source device 302. In other embodiments, fine grain shredding algorithm may be received at source device 302. The product of fine grain shredding algorithm A executed on secure communication 308 may be secure communication segments A, shown at 310.

Recombination key A, shown at 314, may be a key suitable for recombining data subjected to fine grain algorithm A, such as secure communication segments A. Therefore, recombination key A may be able to reconstruct secure communication 308 from secure communication segments A.

Secure communication segments A may be transmitted to intermediary device 304, as shown at communication 316. It should be appreciated that communication 316 may be labeled S1. Communications labeled S1 may be completed prior to communications labeled S2.

Recombination key A may be transmitted to intermediary device 304, as shown at communication 318. Communication 318 may be labeled S1, and therefore, may be completed prior to communications labeled S2.

Communication 320 may show the destruction of secure communication segments A. Communication 320 may be labeled S2. S2 may indicate that the destruction of secure communication segments A may be initiated only upon completion of communication 316 and/or 318.

Communication 322 may show the destruction of recombination key A. Communication 322 may be labeled S2. S2 may indicate that the destruction of recombination key A may be initiated only upon completion of communication 316 and/or 318.

Communication 324 may show the destruction of fine grain shredding algorithm A, shown at 312. Communication 324 may be labeled S2. S2 may indicate that the destruction of fine grain shredding algorithm A may be initiated only upon completion of communication 316 and/or 318.

Secure communication segments A may be transmitted to intermediary device 304. It should be appreciated that, in some embodiments, secure communication segments A may be transmitted in a group to intermediary device 304. In other embodiments, each of secure communication segments A may be transmitted separately to intermediary device 304.

At intermediary device 304, fine grain shredding algorithm B, shown at 326 may be applied to secure communication segments A, thereby producing secure communication segments B, shown at 328. Recombination key B, shown at 330, which may be generated, created and/or received at intermediary device 304, may be suitable for recombining data subjected to fine grain shredding algorithm B. Recombination key A and recombination key B may be combined into recombination key C, as shown at 332.

Secure communication segments B may be transmitted to target device 306, as shown at communication 334. It should be appreciated that communication 334 may be labeled I1. Communications labeled I1 may be completed prior to the commencement of communications labeled I2.

Recombination key C may be transmitted to target device 306, as shown at communication 336. It should be appreciated that communication 336 may be labeled I1. Communications labeled I1 may be completed prior to the commencement of communications labeled I2.

Communications 338, 340, 342, 344 and 346 may show the destruction of secure communication segments B, fine grain shredding algorithm B, recombination key A, recombination key B and recombination key C. Communications 338, 340, 342, 344 and 346 may be labeled I2. Therefore, communications 338, 340, 342, 344 and 346 may be instantiated upon completion of communications labeled I1.

Target device 306 may separate recombination key C into recombination keys A and B, as shown at 338. Recombination key B may be used to recombine secure communication segments B into secure communication segments A, as shown at 340. Recombination key A may then be used to recombine secure communication segments A into secure communication 308, as shown at 342.

It should be appreciated that multiple shredding algorithms with multiple intermediary devices are contemplated within the scope of the invention.

In some embodiments, a halt time stamp may be included within each recombination key. In the event that the recombination key is not utilized before the time indicated by the halt time stamp, the recombination key and/or the secure communication segments may be destroyed.

In other embodiments, at least one of the secure communication segments may include a halt time stamp. The halt time stamp may be a time stamp when a partial recombination, such as recombination of secure communication segments B into secure communication segments A, may be completed. In the event that the recombination is not completed by the halt time stamp, the secure communication segments may be destroyed.

In yet other embodiments, the halt time stamp may be a time stamp when a full recombination, such as a recombination of secure communication segments B into the secure communication, may be completed. In the event that the full recombination is not completed by the time indicated by the halt time stamp, the secure communication segments and/or the recombination key(s) may be destroyed.

The halt time stamp may heighten the security of the secure communication process. The halt time stamp may ensure that confidential data segments are not available for lengthy time periods. It is undesirable for confidential data segments to be available for lengthy time periods, because the time may allow hackers to attempt to reconstruct the data.

In some embodiments, secure communications segments 328 may include one or more pre-generation key segments. A pre-generation key segment may be hidden within a plurality of the secure communications. The pre-generation key segment may be not readily available or viewable by a user or system that may have intercepted the communication. The pre-generation key segment may be stored to be used as a recombination key for additional secure communication segments. It should be appreciated that, in these embodiments, the recombination key may not be transmitted from source device 302 to intermediary device 304.

In other embodiments, secure communication segments may be divided into sections. Each section may be shredded using a different shredding algorithm. The recombination key for each shredding algorithm may be stored in a segment that was shredded using a different algorithm. Each segment may be transmitted individually to intermediary device 304. In this manner the communications are difficult to intercept. In the event that the communications are intercepted, the communications are difficult to recombine because the recombination key has been transmitted with a different communication.

It should be appreciated that once the recombination key is used for a specific set of communication segments, it may be marked as used, and unavailable for use as a recombination key at another secure communication transmission.

Figure 4:
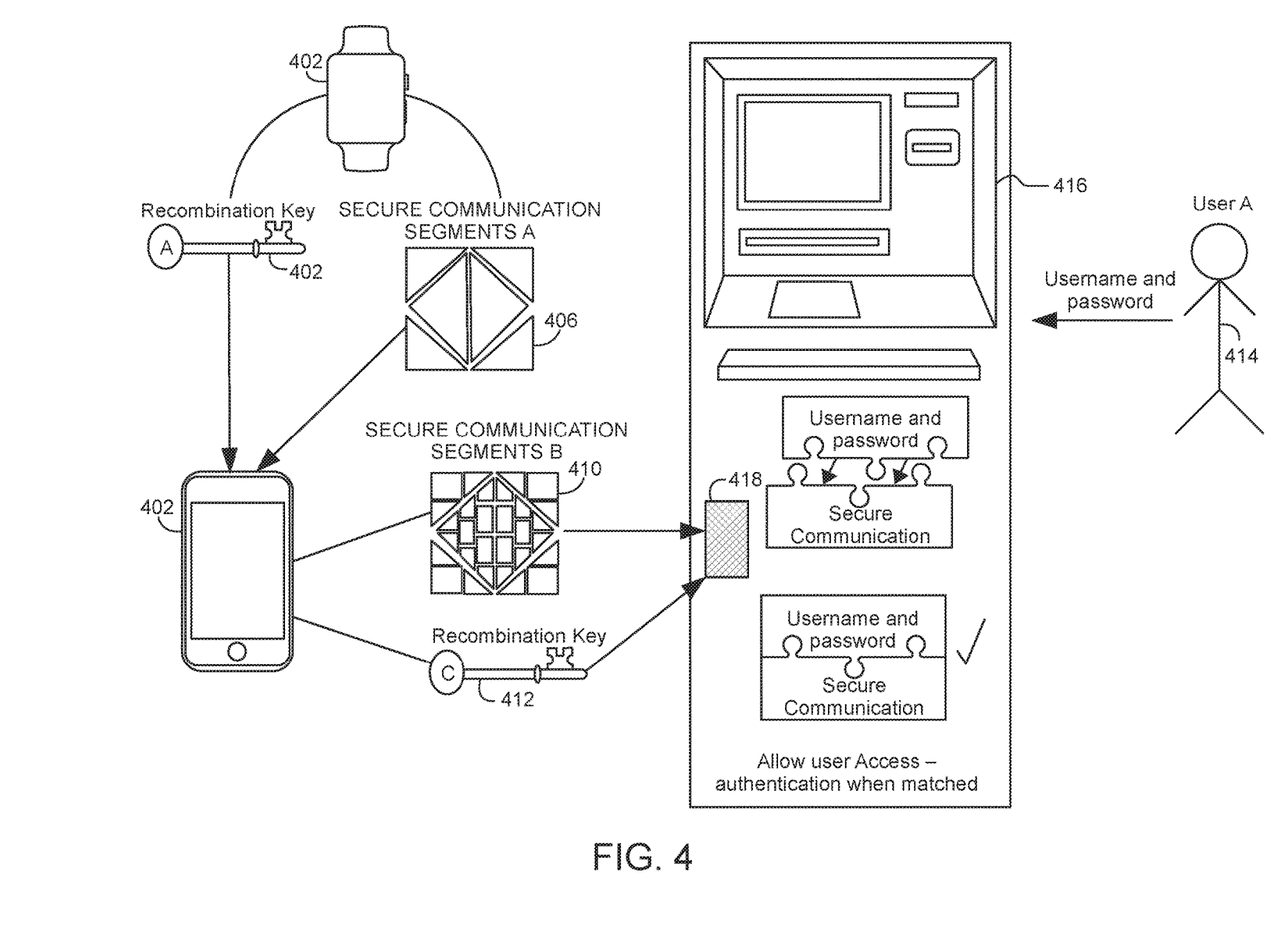
FIG. 4 shows another illustrative diagram in accordance with principles of the invention.

FIG. 4 shows an illustrative diagram. Smart watch 402 and smart phone 408 may be worn on the body of user A, shown at 414. User A may desire to be authenticated into automated teller machine ("ATM") 416.

At ATM 416, smart watch 402 may receive a message from ATM 416 to authenticate user A. The message may be received via Beacon, Bluetooth, NFC (near field communication) or other such communication medium. Smart watch 402 may generate and/or receive a secure authentication communication. Smart watch 402 may shred the secure authentication communication into secure communication segments A, shown at 406. Smart watch 402 may generate and/or receive recombination key A, which may be suitable for recombination of secure communication segments A into the secure communication.

Smart watch 402 may transmit secure communication segments A, shown at 406 and recombination key, shown at 404, to smart phone 408. Smart phone 408 may shred secure communication segments A into secure communication segments B. Smart phone 408 may also generate recombination key C. Recombination key C may be suitable for recombining secure communication segments B into the secure communication. Smart phone 408 may transmit secure communication segments B and recombination key C to ATM 416. Secure communication segments B may be transmitted as a group, individually or a plurality of smaller groups. Secure communication segments B may be transmitted together with recombination key C. Secure communication segments B may be transmitted in a separate communication from recombination key C.

ATM 416 may receive secure communication segments B and recombination key C. ATM 416 may recombine secure communication segments B into the secure communication using secure communication segments B, as shown at 418. The secure communication may provide a keyhole, or a method of entry for a username and password.

User A may be prompted by ATM 416 to enter a username and password. ATM 416 may receive a username and password from user A. ATM 416 may enter username and password into the secure communication, as shown at 416. If the username and password properly satisfy the keyhole of the secure communication, ATM 416 may allow access to user A.

Figure 5:
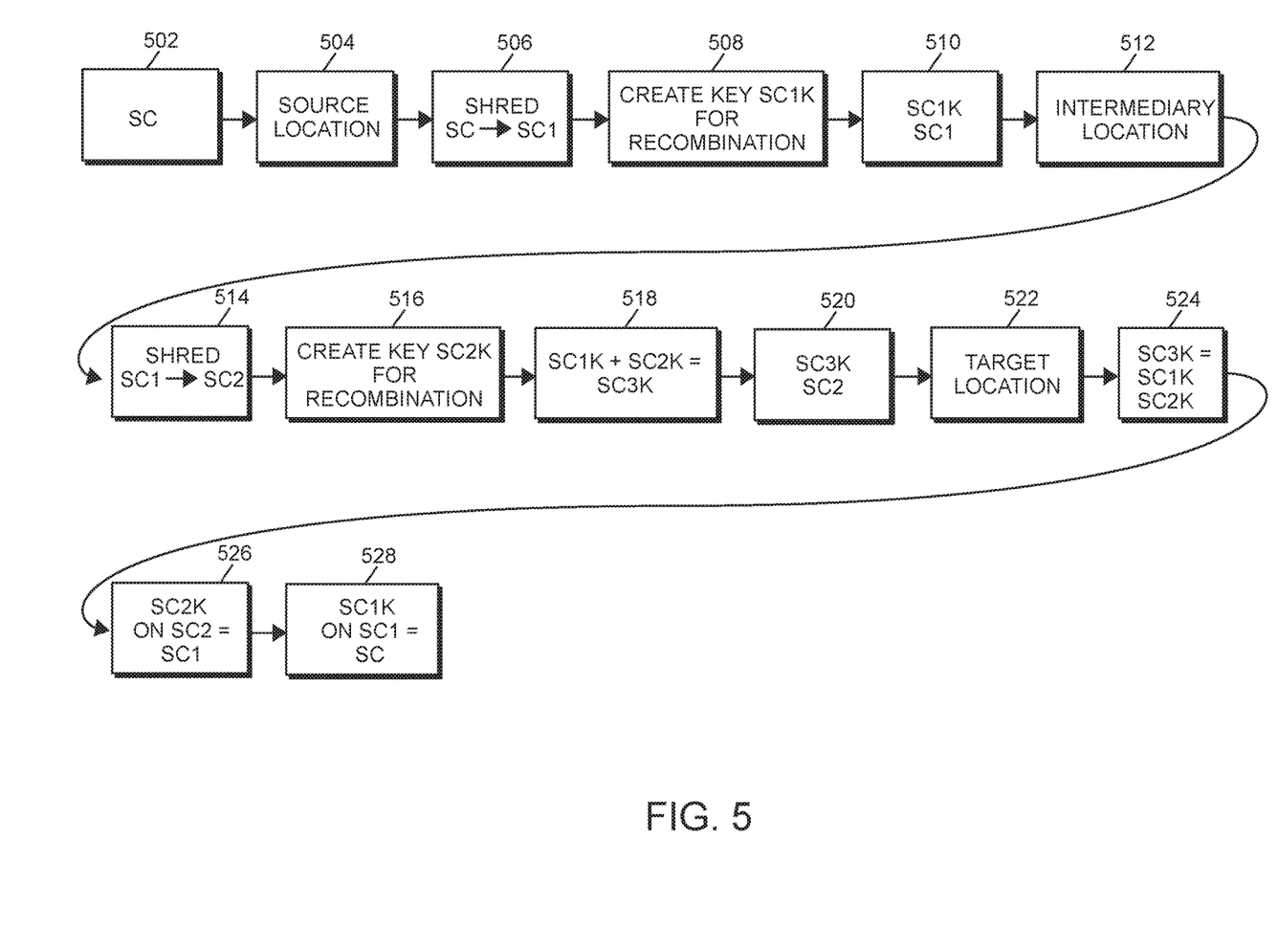
FIG. 5 shows another illustrative flow chart in accordance with principles of the invention.

FIG. 5 shows an illustrative flow chart. Source communication ("SC"), shown at 502 may be received, generated and/or created at source location 504. Source location 504 may shred SC into source communication segments 1 ("SC1"), as shown at 506.

A key ("SC1K") for recombination of SC1 is created and/or generated, as shown at 508. SC1K and SC1 may be transmitted, as shown at 510, to an intermediary location, as shown at 512. SC1 may be shredded to SC2, as shown at 514. A key ("SC2K") may be created for recombination, as shown at 516. SC1K and SC2K may be combined into a third key ("SC3K"), as shown at 518. SC3K and SC2 may be transmitted, as shown at 520, to target location 522. SC3K may be separated into SC1K and SC2K, as shown at 524.

SC2K may be used to recombine SC2 into SC1, as shown at 526. SC1K may be used to recombine SC1 into SC.

Figure 6:
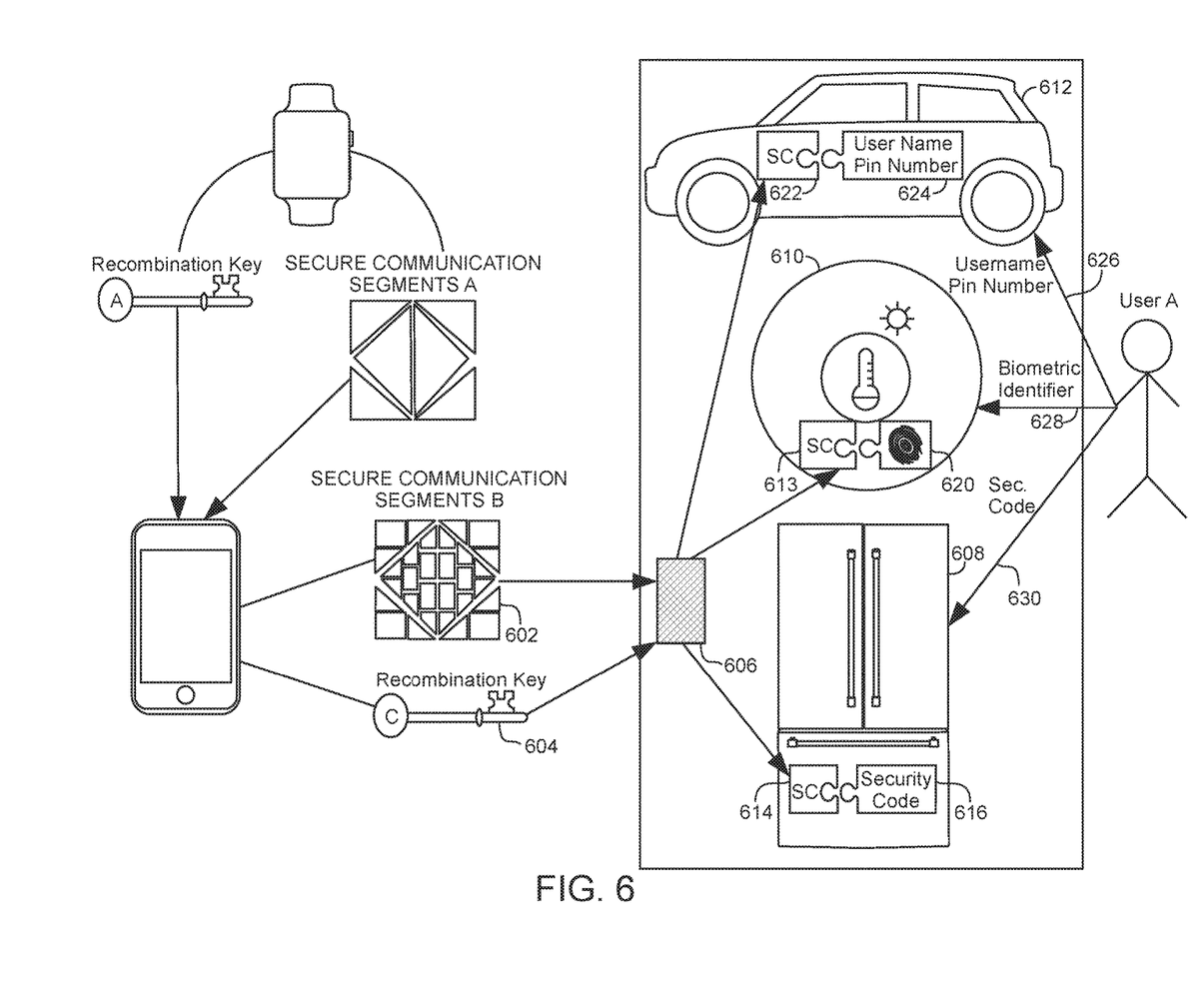
FIG. 6 shows another illustrative diagram in accordance with principles of the invention.

FIG. 6 shows various embodiments for use of a secure communication. Secure communication segments B, shown at 602, may be recombined, at 606, using recombination key C, shown at 604.

Vehicle 612 may receive the secure communication, shown at 622. Vehicle 612 may also receive username and pin number, shown at 624. The username and pin number may be received from user A, via communication 626. Secure communication 622 may provide a keyhole for username and pin number 624. In the event that the username and pin number is authenticated, user A may be allowed access to vehicle 612.

Thermostat 610 may receive the secure communication, shown at 618. Thermostat 610 may also receive biometric identifier, shown at 620. The biometric identifier may be received from user A, via communication 628. Secure communication 688 may provide a keyhole for biometric identifier 620. In the event that the biometric identifier is authenticated, user A may be allowed access to thermostat 610.

Refrigerator 608 may receive the secure communication, shown at 614. Refrigerator 608 may also receive security code, shown at 616. The security code may be received from user A, via communication 630. In the event that the security code is authenticated user A may be allowed access to refrigerator 608.

Thus, methods and apparatus for IoT self-segmented blocks have been provided. Persons skilled in the art will appreciate that the present invention can be practiced by other than the described embodiments, which are presented for purposes of illustration rather than of limitation, and that the present invention is limited only by the claims that follow.

What is claimed is:

1. A system for secure communication transmission between a source device and a target device via a plurality of devices, the system comprising:
    the source device, said source device configured to:
        create and/or receive a secure communication;
        shred the secure communication into a first plurality of communication segments using a first fine-grain shredding algorithm;
        create a first recombination key suitable for recombining data subjected to the first fine-grain shredding algorithm;
        transmit each of the first plurality of communication segments and the first recombination key to an intermediary device, said intermediary device being one of the plurality of devices; and
        destroy the first recombination key, the plurality of communication segments and the secure communication resident on the source device;
    the intermediary device, said intermediary device configured to:
        shred the first plurality of communication segments into a second plurality of communication segments using a second fine-grain shredding algorithm;
        create a second recombination key suitable for recombining data subjected to the second fine-grain shredding algorithm;
        merge the first recombination key with second recombination key into a third recombination key;
        transmit each of the second plurality of communication segments and the third recombination key to the target device; and
        destroy the first recombination key, the second recombination key, the third recombination key and the plurality of communication segments resident on the intermediary device; and
    the target device configured to:
        separate the third recombination key into the first recombination key and the second recombination key;
        recombine the second plurality of communication segments into the first plurality of communication segments using the second recombination key; and
        recombine the first plurality of communication segments into the secure communication at the target device.

2. The system of claim 1, wherein:
    the intermediary device is further configured to:
        use an encryption key/algorithm to merge the first recombination key with the second recombination into the third recombination key;
        transmit the encryption key/algorithm to the target device; and
        destroy the encryption key/algorithm at the intermediary device; and
    the target device is further configured to:
        use the encryption key/algorithm to separate the third recombination key into the first recombination key and the second recombination key.

3. The system of claim 1, wherein the third recombination key is a concatenation of the first recombination key and the second recombination key.

4. The system of claim 1, wherein the source device, the intermediary device and/or the target device is a human-wearable device.

5. The system of claim 1, wherein:
    the target device is an Internet of Things device requiring authentication of a user;
    the secure communication comprises authentication information relating to the user; and
    the secure communication enables the user to authenticate into the target device.

6. The system of claim 5, wherein said authentication into comprises entering a user identifier and password into the target device.

7. The system of claim 6, wherein:
    the secure communication comprises an authentication channel for the user identifier and password which enables authentication into the target device.

8. A method for transmitting secure communications from a source device to a target device via a plurality of devices, the method comprising:
    creating and/or receiving a secure communication at the source device;
    shredding, at the source device, the secure communication into a first plurality of communication segments using a first fine-grain shredding algorithm;
    creating, at the source device, a first recombination key suitable for combining data subjected to the first fine-grain shredding algorithm;
    transmitting each of the first plurality of communication segments and the first recombination key to an intermediary device, said intermediary device being one of the plurality of devices;
    destroying the first recombination key and/or the plurality of communication segments stored at the source device;
    shredding, at the intermediary device, the first plurality of communication segments into a second plurality of communication segments using a second fine-grain shredding algorithm;
    creating, at the intermediary device, a second recombination key suitable for combining data subjected to the second fine-grain shredding algorithm;
    merging the first recombination key with the second recombination key into a third recombination key;
    transmitting each of the second plurality of communication segments and the third recombination key to the target device;
    destroying the first recombination key, the second recombination key, the third recombination key and/or the plurality of communication segments stored at the intermediary device;

separating the third recombination key into the first recombination key and the second recombination key at the target device;

recombining the second plurality of communication segments into the first plurality of communication segments using the second recombination key; and recombining the first plurality of communication segments into the secure communication at the target device.

9. The method of claim 8, wherein the source device, the intermediary device and/or the target device is a human-wearable device.

10. The method of claim 8, wherein:

the target device is a device requiring authentication of a user;

the secure communication comprises authentication information relating to the user; and the secure communication enables the user to authenticate into the target device.

11. The method of claim 10, wherein said authenticating into comprises entering a user ID and password into the target device.

12. The method of claim 11, wherein said user ID and password correspond to information in the secure communication.

13. A system for secure communication transmission between a source device and a target device via a plurality of devices, the system comprising:

the source device, said source device configured to:

create and/or receive a secure communication;

shred the secure communication into a first plurality of communication segments using a first fine-grain shredding algorithm;

create a first recombination key suitable for recombining data subjected to the first fine-grain shredding algorithm;

store a second recombination key in the first plurality of communication segments, the second recombination key suitable for recombining data subjected to a second fine-grain algorithm;

transmit each of the first plurality of communication segments and the first recombination key to an intermediary device, said intermediary device being one of the plurality of devices; and the intermediary device, said intermediary device configured to:

shred the first plurality of communication segments into a second plurality of communication segments using a third fine-grain shredding algorithm;

create a third recombination key suitable for recombining data subjected to the second fine-grain shredding algorithm;

merge the first recombination key with third recombination key into a fourth recombination key;

transmit each of the second plurality of communication segments and the fourth recombination key to the target device;

store the second recombination key to be used as a recombination key for a future secure communication, said future secure communication being shredded using the second fine-grain algorithm; and the target device configured to:

separate the fourth recombination key into the first recombination key and the third recombination key;

recombine the second plurality of communication segments into the first plurality of communication segments using the third recombination key; and recombine the first plurality of communication segments into the secure communication at the target device using the first recombination key.

14. The system of claim 13, wherein:

the intermediary device is further configured to:

use an encryption key/algorithm to merge the first recombination key with the third recombination into the fourth recombination key; and transmit the encryption key/algorithm to the target device; and the target device is further configured to:

use the encryption key/algorithm to separate the fourth recombination key into the first recombination key and the third recombination key.

15. The system of claim 13, wherein the fourth recombination key is a concatenation of the first recombination key and the third recombination key.

16. The system of claim 13, wherein the source device, the intermediary device and/or the target device is a human-wearable device.

17. The system of claim 13, wherein:

the target device is an Internet of Things device requiring authentication of a user;

the secure communication comprises authentication information relating to the user; and the secure communication enables the user to authenticate into the target device.

18. The system of claim 17, wherein said authentication into comprises entering a user identifier and password into the target device.

19. The system of claim 18, wherein:

the secure communication comprises an authentication channel for the user identifier and password, said authentication channel enables authentication into the target device.

* * * * *